United States Patent
Manaka

(10) Patent No.: US 6,301,882 B1
(45) Date of Patent: Oct. 16, 2001

(54) EXHAUST GAS PURIFICATION CONTROL APPARATUS OF ENGINE

(75) Inventor: Toshio Manaka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/276,906

(22) Filed: Mar. 26, 1999

(30) Foreign Application Priority Data

Mar. 26, 1998 (JP) .................................................. 10-078896

(51) Int. Cl.$^7$ ....................................................... F01N 3/00
(52) U.S. Cl. ................................ 60/285; 60/274; 60/301; 60/276
(58) Field of Search ............................. 60/274, 276, 285, 60/301

(56) References Cited

U.S. PATENT DOCUMENTS

| | | | |
|---|---|---|---|
| 5,402,641 | * 4/1995 | Katoh et al. ............................ | 60/285 |
| 5,954,040 | * 9/1999 | Riedel .................................. | 123/703 |
| 5,983,627 | * 11/1999 | Asik ...................................... | 60/274 |

FOREIGN PATENT DOCUMENTS

| | | |
|---|---|---|
| 196 36 790 | 3/1998 | (DE) . |
| 198 37 074 | 3/1999 | (DE) . |
| 19802631C | * 7/1999 | (DE) . |
| 0 560 991 | 7/1997 | (EP) . |
| 402005728A | * 1/1990 | (JP) . |
| 402005731A | * 1/1990 | (JP) . |
| 6-088518 | 1/1994 | (JP) . |
| 6-88518 | 3/1994 | (JP) . |
| 7-186785 | 7/1995 | (JP) . |
| 7-217474 | 8/1995 | (JP) . |
| 2600492 | 1/1997 | (JP) . |
| 410274031A | * 10/1998 | (JP) . |
| 411107840A | * 4/1999 | (JP) . |

* cited by examiner

*Primary Examiner*—Thomas Denion
*Assistant Examiner*—Thai Ba Trieu
(74) *Attorney, Agent, or Firm*—Crowell & Moring LLP

(57) ABSTRACT

An exhaust gas purification control apparatus is used for an engine provided with a NOx catalyst absorbing or adsorbing NOx when an air fuel ratio of exhaust gas from the engine is lean and reducing the absorbed or adsorbed NOx when the exhaust gas is at the stoichiometric air fuel ratio or richer in fuel, and an exhaust sensor arranged upstream or downstream of the NOx catalyst, and characterized in that thed exhaust gas purification control apparatus comprises a sulphur component calculating means for calculating or estimating a quantity of sulphur components in the exhaust gas and an operation mode changing means for changing an air fuel ratio of the engine on the basis of the detected value of the sulphur components, and the calculated or estimated value of sulphur components is a prescribed value or more, the operation changing means decreases frequencies of lean mode operation of the engine, shortens continuation time of the lean mode operation or prohibits the lean mode operation.

4 Claims, 5 Drawing Sheets

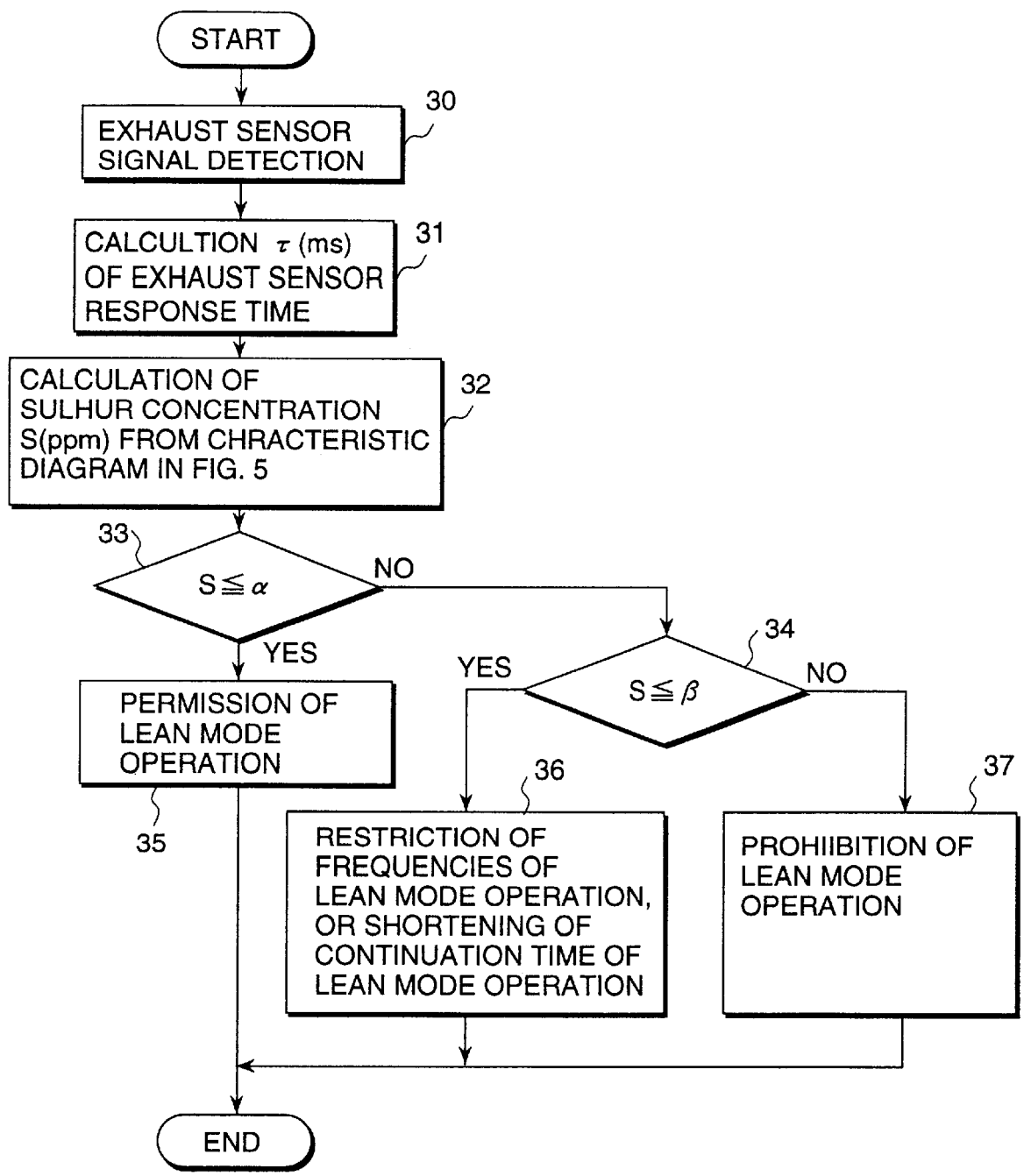

EXHAUST GAS PURIFICATION CONTROL APPARATUS OF ENGINE

BACKGROUND OF THE INVENTION

The present invention relates to an exhaust gas purification control apparatus of an engine and, more particularly, to an exhaust gas purification control apparatus of an engine which is provided with a NOx catalyst and executes lean fuel combustion (lean burn) operation.

Lean burn engines have been developed in order to improve a fuel consumption efficiency and attain emission control of $CO_2$. On the other hand, it is practiced as usual means to provide a three way catalyst in an exhaust line of an engine to purify exhaust gas from the engine. However, the three way catalyst is suitable for purifying exhaust gas about a stoichiometric air fuel ratio, but it has a low NOx purification performance in a region of a lean air fuel ratio. Therefore, it is desired to develop techniques of suppressing emission of NOx into atmosphere in the lean air fuel ratio region in the case where a lean burn engine is used.

As one of the developed techniques, an exhaust gas purification control apparatus is proposed (in Japanese patent No. 2600492), which apparatus is provided with a NOx absorbent in an exhaust passage, absorbing NOx when the engine exhaust gas in a lean air fuel ratio region and releasing the absorbed NOx by lowering the oxygen concentration in the exhaust gas, wherein NOx is absorbed in the absorbent when the exhaust gas is in the lean air fuel ration region, and the absorbed NOx is released by lowering the oxygen concentration in the exhaust gas flowing in the NOx absorbent.

However, even if such an apparatus is used, there is a problem that when sulphur components are contained in the engine exhaust gas in a relation with fuel compositions, the NOx absorbent reacts with sulphur (SOx) to turn into sulphide and the NOx absorbing performance is remarkably lowered. Further, when the NOx absorbent reacts with sulphur (SOx) to turn into sulphide and the sulphide is absorbed, it is difficult to release the absorbed sulphide from the NOx absorbent and the NOx absorbent has a strong tendency to be poisoned forever, so that it is difficult to recover the NOx absorbent and the life of the NOx absorbent is shortened.

In a control apparatus of a lean burn engine with a NOx absorbent, in order to prevent the sulphide formed by reaction with sulphur from being stayed in the NOx absorbent, a technique is proposed in JP A 7-217474, in which a means for estimating a quantity of SOx absorbed in the NOx absorbent and a means for detecting the temperature of the NOx absorbent are provided in the control apparatus, and an air fuel ratio of the exhaust gas flowing in the NOx absorbent is made rich temporarily to release SOx from the NOx absorbent and recover the NOx absorbent when a quantity of SOx estimated to be absorbed in the NOx absorbent when an air fuel ratio of the exhaust gas flowing into the NOx absorbent during operation of the engine is a stoichiometric value or lean becomes over an allowable value and the temperature of the NOx absorbent is higher than a preset temperature. Further, there are proposed in JP A 6-88518, JP A 7-186785) various techniques of recovering a NOx absorbent by detecting an air fuel condition of an engine, a temperature condition of the NOx absorbent and an quantity of SOx in the NOx absorbent, and controlling the air fuel ratio of the engine to release the SOx absorbed in the NOx absorbent, as well as the above technique.

Any of the above proposed techniques is for recovering a NOx absorbent by releasing and separating SOx absorbed in the NOx absorbent from the NOx absorbent, and a means is taken for measuring and estimating a quantity, etc. of SOx contained in the NOx absorbent and controlling an engine air fuel ratio. That is, a main point of the techniques is laid on how the SOx absorbed into the NOx absorbent is excluded, and it is not a technique for preventing deterioration of the NOx absorbent by SOx, by preventing SOx from being absorbed in the NOx absorbent.

As mentioned above, once sulphur (SOx) is turned into sulphide and absorbed into the NOx absorbent, it is difficult to release the absorbed sulphide and the NOx absorbent has a strong tendency to be poisoned forever, so that it is not easy to sufficiently recover the NOx absorbent even by using the above-mentioned techniques and the problem of deterioration of the NOx absorbent is sill left.

SUMMARY OF THE INVENTION

The present invention is made in view of the above-mentioned problems, and an object of the present invention is to provide an exhaust gas purification control apparatus which is able to use a NOx catalyst (absorbent) for a long time without being poisoned even in an exhaust gas including sulphur components (SOx) in a lean burn engine, and it is also to provide an exhaust gas purification control apparatus in which a quantity of emission of NOx does not increase even when response to signals of an exhaust gas sensor became slow.

In order to attain the object, an exhaust gas purification control apparatus according to the present invention is basically used in an engine provided with a NOx catalyst absorbing or adsorbing NOx when a air fuel ratio of exhaust gas is lean and reducing the absorbed or adsorbed NOx when the exhaust gas is a mixture gas richer than a stoichiometric air fuel ratio, and an exhaust sensor arranged upstream or downstream of the NOx catalyst, and characterized in that a sulphur component calculating means for calculating or estimating a value of sulphur components in the exhaust gas, and an operation mode changing means for changing an air fuel ratio of the engine on the basis of a calculated or estimated value of the sulphur components are provided, and the operation mode changing means decreases frequencies of a lean mode operation of the engine or shortens continuing time of the lean mode operation or prohibits the lean mode operation, when the calculated or estimated value of sulphur components is a predetermined value or more.

A preferable aspect of the present invention is characterized in that a sulphur concentration sensor for sensing the concentration of sulphur is arranged in the exhaust duct of the engine, the above-mentioned sulphur component calculating means calculates or estimates the concentration of sulphur on the basis of output signals of the above-mentioned exhaust sensor, and the above-mentioned sulphur component calculating means estimates that the sulphur concentration value to be high as the response becomes slower.

The engine exhaust gas purification control apparatus of the present invention constructed as above estimates or calculates the sulphur concentration in the exhaust gas flowing in the engine exhaust duct, using the exhaust sensor or the sulphur concentration sensor, changes operation modes of air fuel ratio of the engine on the basis of the calculated result, and takes such an operation mode that sulphur components are not absorbed into the NOx catalyst, so that it is possible to prevent sulphur deterioration of the NOx catalyst and increase of the NOx emission amount.

BRIEF DESCRIPTION OF THE DRAWINGS

FIG. 7 is a control flow chart of the engine exhaust gas purification control apparatus of the present embodiment.

DESCRIPTION OF EMBODIMENT OF THE INVENTION

Figure 1:
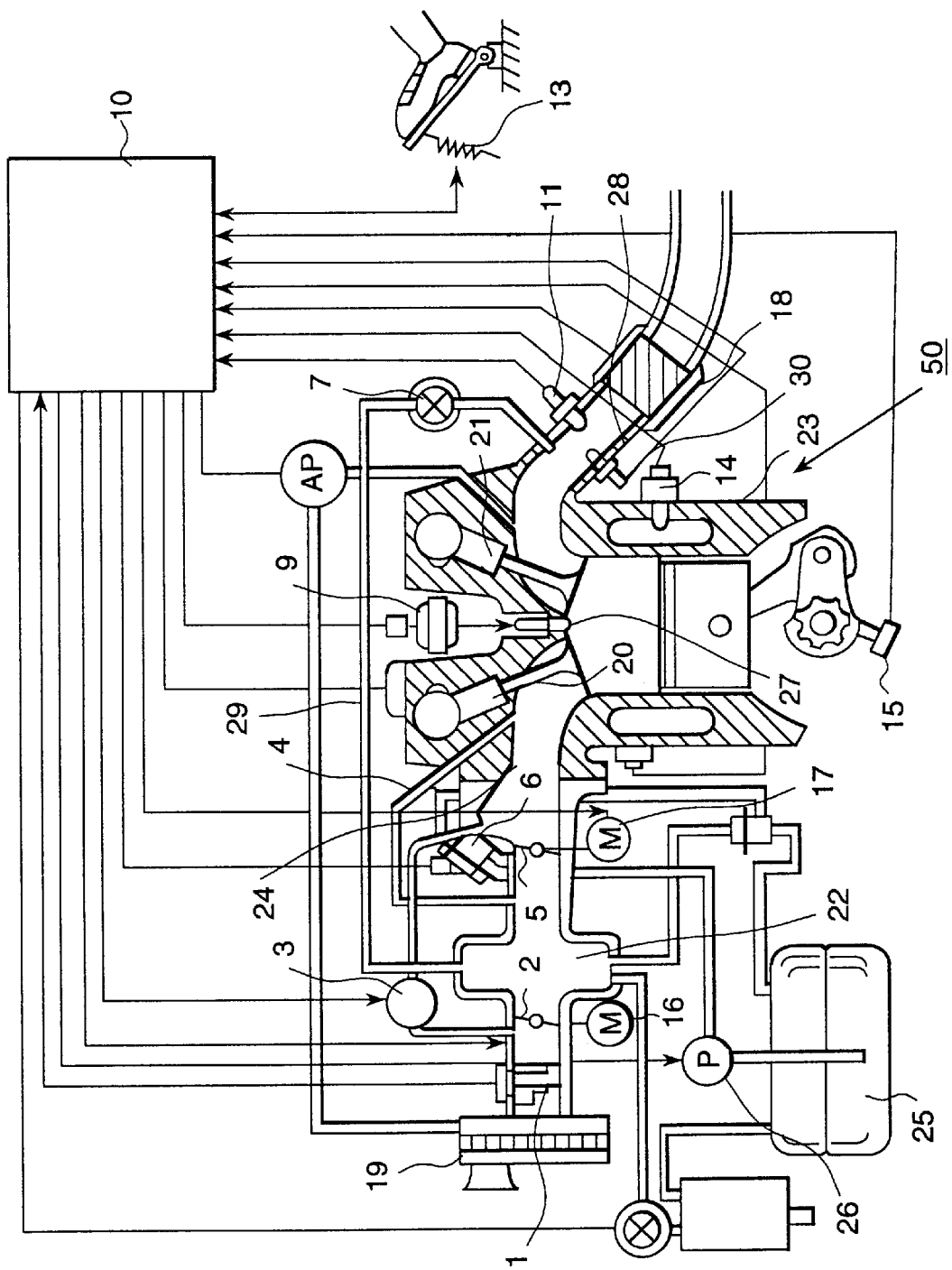
FIG. 1 is a schematic diagram of a whole construction of an engine system provided with an engine exhaust gas purification control apparatus of an embodiment of the present invention.

An engine exhaust gas purification control apparatus of an embodiment of the present invention will be described hereunder in detail, referring to the drawings.

FIG. 1 shows the whole construction of a control system of an engine provided with the exhaust gas purification control apparatus of the embodiment. In FIG. 1, air to be taken in the engine 50 is taken in from an air cleaner 19, and enters a collector 22 through an intake air flow meter 1 and a throttle valve 2 controlling an intake flow rate. The throttle valve 2 is connected to an electronic throttle actuator 16 for driving the throttle valve 2, and an intake air flow rate can be controlled by operating the throttle valve 2 by driving the electronic throttle actuator 16.

The intake air reached the collector 22 is distributed to each intake duct 24 connected to each cylinder 23 of the engine 50 and then introduced into a combustion chamber of the cylinder 23.

On the other hand, fuel such as gasoline is sucked from a fuel tank 25 and pressurized by a fuel pump 26, and then injected from an injector 6 into each intake duct 24.

The air and fuel entered the combustion chamber in the cylinder 23 by opening an intake valve 20 are mixed, ignited by an ignition plug 27 to which voltage is applied from an ignition coil and then burnt.

Exhaust gas formed by combustion in the combustion chamber of the above-mentioned engine 50 is led to the exhaust duct 28 by opening an exhaust valve 21, and discharged out of the engine 50 through a NOx catalyst 18. A part of the exhaust gas in the exhaust duct 28 is recirculated to the collector 22 through piping 29. The piping 29 has an EGR valve 7 arranged on the way for controlling a quantity of exhaust gas to be recirculated. The EGR valve 7 electrically controls an opening area thereof on the basis of a pressure difference between at an upstream side and at a downstream side of the EGR valve 7 and an air fuel ratio of the exhaust gas, thereby to determine a quantity of exhaust gas to be recirculated.

An air flow sensor 1, a revolution sensor 15, a water temperature sensor 14 and an accelerator pedal sensor (load detection sensor) 13 are arranged in the system, and detection signals from respective sensors are input into a control unit 10 in which an intake air quantity Qa sucked into the engine 50, engine revolution numbers N, engine cooling water temperature Tw, etc. are calculated. In the exhaust duct 29, an exhaust sensor 11 and a sulphur concentration sensor 30 are arranged, the exhaust sensor 11 detects an air fuel ratio of the exhaust gas, the sulphur concentration sensor 30 detects the concentration of sulphur and detection signals from the sensors 11, 30 are input into the control unit 10.

The electronic throttle actuator 16 opens and closes the throttle valve 2 on the basis of signals of the accelerator pedal sensor 13, whereby a quantity of intake air to be sucked into the engine 50 is changed to control the engine output. In order to atomize well the fuel injected from the injector 6, an air jet flow is supplied from an assist air control valve 3 to a jet port of the injector 6. It is possible to use an air pump for assist air instead of the assist air control valve 3.

Gas flow control inside the cylinder 23 of the engine 50 is executed by opening and closing a throttle valve 5 by driving a gas flow actuator 17 to adjust an air flow quantity passing through a gas flow production passage 4. Air jetted from the gas flow production passage 4 flows powerfully into the cylinder 23 and forms tumble flow and swirl flow in the cylinder 23. Thereby, stratified combustion is effected, so that lean combustion (lean burn) can be realized. Ignition in the cylinder 23 is executed by the ignition coil 9. Delay in timing of the ignition can decrease exhaust gas and the temperature of the exhaust gas rises, so that it is possible to activate the catalyst early.

The EGR control valve 7 is for reducing an emission amount of NOx by lowering the combustion temperature by introducing the exhaust gas to the side of the intake duct 24 of the engine 50. The NOx catalyst has a function of purifying exhaust gas (a three way catalytic function) and a function of absorbing or adsorbing NOx during lean mode operation and reducing the absorbed or adsorbed NOx when the mixture is at the stoichiometric air fuel ratio (A/F=14.7) or richer. It is possible to use a reaction type NOx catalyst instead of the NOx catalyst which absorbs or adsorbs NOx during the lean mode operation.

Further, the above-mentioned control unit 10 takes in signals from various sensors, etc. detects operation conditions of the engine 50, executes a predetermined processing, outputs various kinds of control signals obtained as a result of the processing, that is, outputs the signals to the injector 6, the ignition coil 9, the electronic throttle actuator 16 for actuating the throttle valve, the electronically controlled EGR valve 7, etc. and executes fuel supply control, ignition timing control, intake air flow rate control, control for taking measures against the emission control, etc..

The exhaust sensor 11 provided upstream of the NOx catalyst 18 detects an air fuel ratio, the gas concentration, etc., of exhaust gas, and an $O_2$ sensor of type of detecting whether it is rich or lean than the stoichiometric air fuel ratio, a linear A/F sensor by which linear output voltage can be obtained according to air fuel ratios, etc. are used as the exhaust sensor 11.

Figure 2:
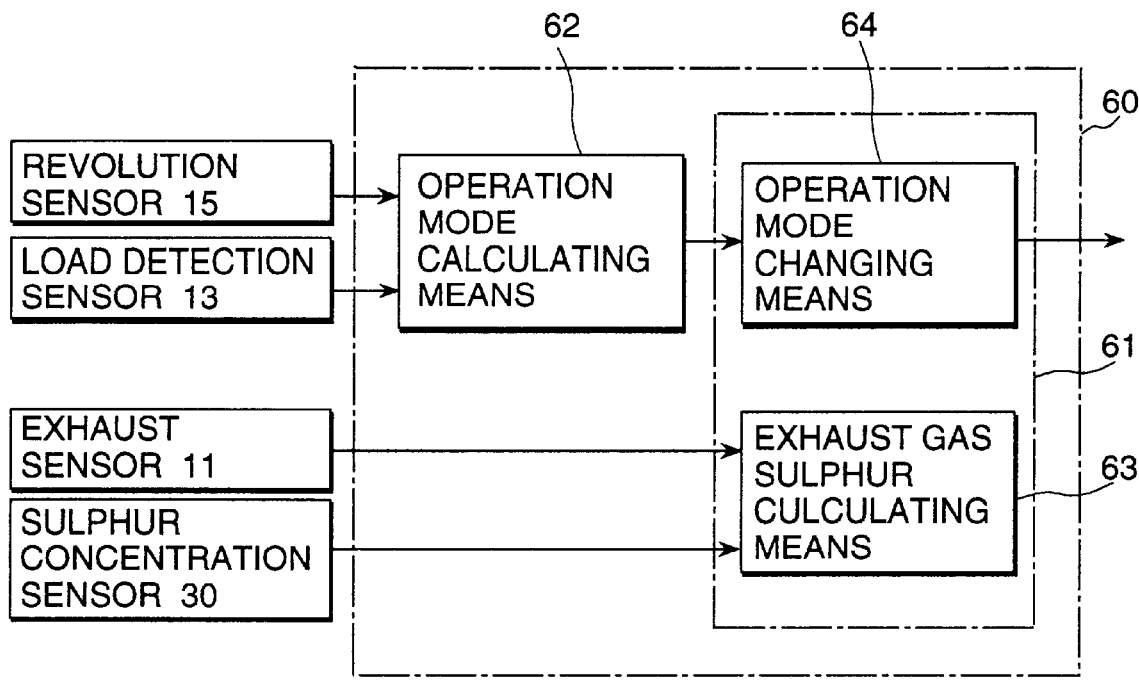
FIG. 2 is a block diagram of control of the engine exhaust gas purification control apparatus in FIG. 1.

Further, the control unit 10 calculates engine speed fluctuation of the engine 50 by processing signals detected by a crank angle sensor 15. The engine speed fluctuation of the engine 50 has a good correlation with the stability of combustion in the engine. FIG. 2 is a control block diagram of the exhaust gas purification control apparatus of the present embodiment. An engine control apparatus 60 representative of interior functions of the control unit 10 comprises an exhaust gas purification control apparatus 61 which comprises an exhaust gas sulphur component calculating means 63 and an air fuel ratio operation mode changing means 64. The engine control apparatus 60 comprises an air fuel ratio operation mode calculating means 62 which calculates operation modes of lean, rich, etc. determining an air fuel ratio on the basis of output signals from the revolution sensor 15, load detection sensor, etc..

The sulphur component calculating means 63 of the exhaust gas calculates or estimates the concentration of sulphur contained in the exhaust gas flowing in the exhaust duct 28 on the basis of output signals from the exhaust sensor 11 and outputs them to the operation mode changing means 64. The operation mode changing means 64 changes the operation mode calculated by the operation mode calculating means on the basis of a value of the sulphur concentration when the value is a predetermined value or higher. The mode changing includes reduction of frequencies of lean mode operation of the engine, shortening of continuation time of the lean mode operation and prohibition of the lean mode operation. The mode changing prevents increase in sulphur poisoning of the NOx catalyst and increase in NOx emission amount.

Figure 3:
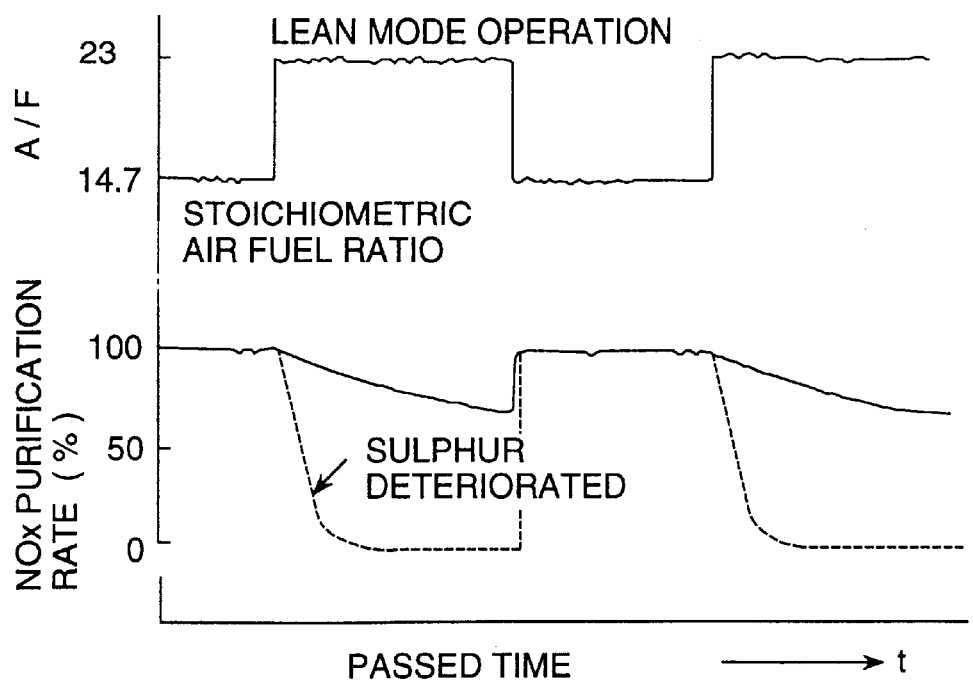
FIG. 3 is a diagram showing NOx purification rates (in normal time and in sulphur deterioration time) of a NOx catalyst, corresponding to engine air fuel ratios.

FIG. 3 shows change in air fuel ratio A/F and NOx purification rate (percentage) of the NOx catalyst 18 when the engine 50 repeats a stoichiometric air fuel ratio mode operation and a lean mode operation. The NOx catalyst 18 has a function of absorbing or adsorbing NOx lowered according to time passage immediately after being changed to the lean mode operation, so that the NOx purification rate also decreases as the function decreases. When the NOx catalyst 18 is poisoned with sulphur, the function of absorbing or adsorbing NOx is remarkably deteriorated, and the NOx purification rate decreases rapidly as shown by dotted lines. As for the poisoning with sulphur, a speed of deterioration can be made slower by reducing frequencies of the lean mode operation. That is, it is because when the oxygen concentration necessary to form sulphide decreases, it becomes difficult to turn the NOx absorbent or adsorbent into sulphide.

Figure 4:
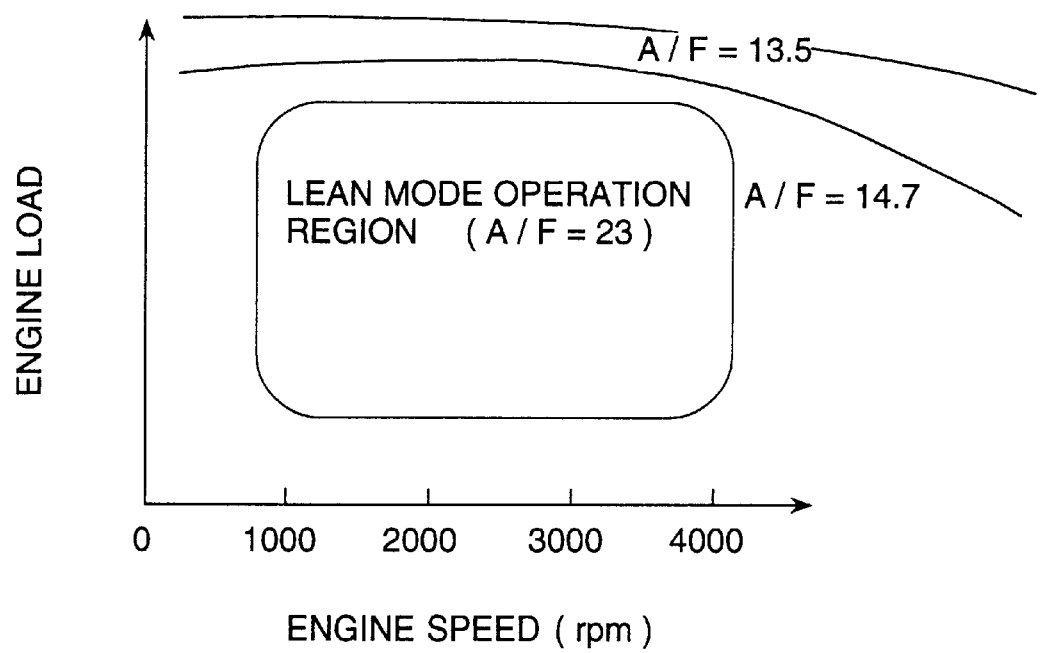
FIG. 4 is a diagram showing a lean mode operation region corresponding to engine speed and loads.

FIG. 4 is a diagram explaining a lean mode operation region from a relation between engine revolutions and engine loads. A usual operation region is a lean mode operation region for good fuel economy (and efficiency), and in a region of large engine load, an air fuel ratio is set the stoichiometric air fuel ratio (A/F=14.7) or an output air fuel ratio (A/F=13.5).

Figure 5:
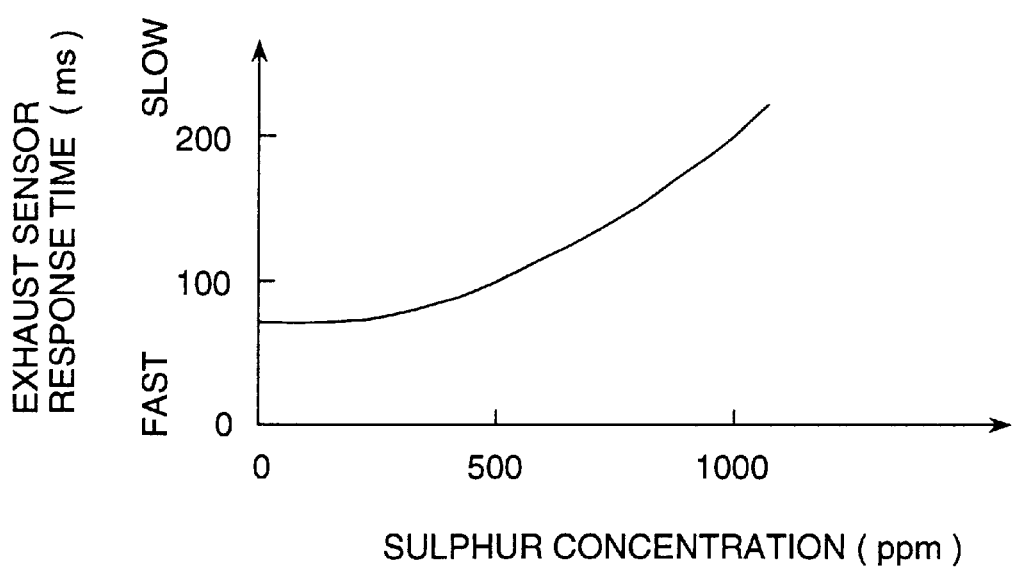
FIG. 5 is a diagram showing responsibility of an exhaust sensor to the sulphur concentration in the exhaust gas.

FIG. 5 shows a relation between the sulphur concentration and a response time of signals of the exhaust sensor. The sulphur concentration can be directly detected by a sulphur concentration sensor 30 particularly provided therefor, however, the sulphur concentration can be estimated indirectly by measuring a response time of the exhaust sensor 11.

Figure 6A:
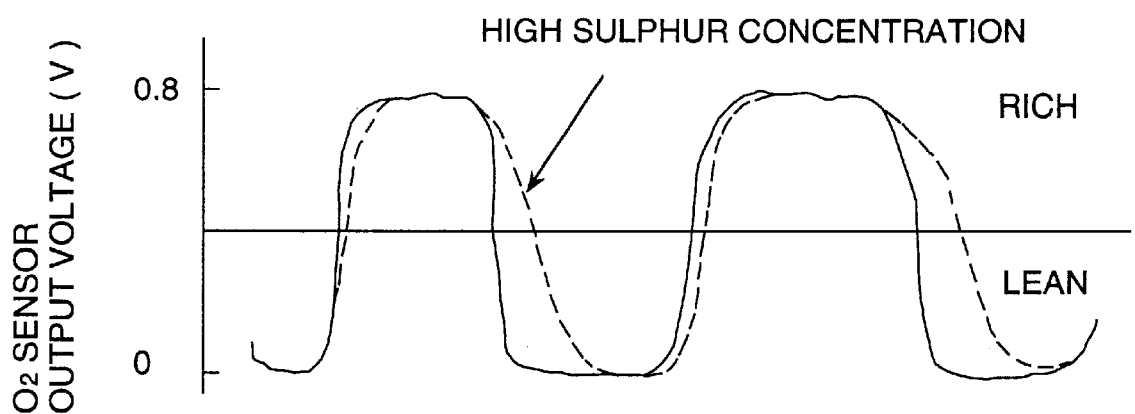
FIG. 6a is a diagram showing detection wave variation of an $O_2$ sensor.
Figure 6B:
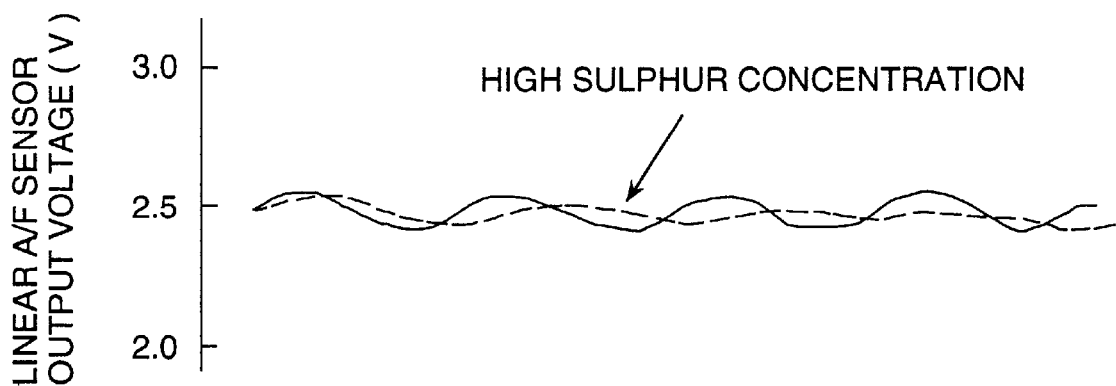
FIG. 6b is a diagram showing detection wave variation of a linear A/F sensor.

FIGS. 6a and 6b show states of change in output voltage signal in the case where the $O_2$ sensor (in FIG. 6a) or the linear A/F sensor (in FIG. 6b) are used as the exhaust sensor 11. When the sulphur concentration in the exhaust gas is high, the response time becomes slow as shown by a dotted line, and the change becomes moderate. The response time can be calculated by differential value of a signal, a response time after the control air fuel ratio changes, or a time that output voltage passes between predetermined voltages.

FIG. 7 is a control flow chart of the exhaust gas purification control apparatus of an engine of this embodiment.

First of all, at step 30, a signal of the exhaust sensor 11 is detected, and at step 31, the response time of the exhaust sensor 11 is calculated on the basis of the above detection. At step 32, the sulphur concentration S (ppm) is calculated from a response time $\tau$ (ms) of the exhaust sensor 11 on the basis of the characteristic diagram in FIG. 5. At step 33, the calculated sulphur concentration S is compared with a predetermined value $\alpha$ to judge whether or not the concentration S is the value a or higher, the flow proceeds to the next step 35 when the sulphur concentration S is the predetermined value or less, and the lean mode operation is permitted and the operation is continued at the step 35. At step 33, when the sulphur concentration S is judged to be the predetermined value $\alpha$ or higher, the flow proceed to step 34. At the step 34, the sulphur concentration S is compared with another predetermined value $\beta$, and when the concentration S is the predetermined value $\beta$ or less, the flow proceeds to step 36 at which frequencies of the lean mode operation is restricted or the continuation time of the lean mode operation is shortened. Otherwise, the lean mode operation is prohibited at step 37. The comparison at steps 33, 34 can be effected by using the response time $\tau$ of the exhaust sensor instead of the sulphur concentration S.

As mentioned above, an embodiment of the present invention is described in detail, but the present invention is not limited to the embodiment, and can be variously modified as long as the conception of the present invention set forth in the claims is contained.

As understood from the above description, the exhaust gas purification control apparatus of the present invention detects the concentration of sulphur in the exhaust gas or a response delay of the exhaust sensor, and decreases frequencies of the lean mode operation or shortens continuation time of the lean mode operation on the basis of the detected value, whereby it is possible to prevent the NOx catalyst from being poisoned with sulphur and to prevent a quantity of emission of NOx from increasing.

What is claimed is:

1. An exhaust gas purification control apparatus of an engine, having a $NO_x$ catalyst absorbing or adsorbing $NO_x$ when an air fuel ratio of exhaust gas from the engine is lean and reducing the absorbed or adsorbed $NO_x$, when the exhaust gas is t the stoichiometric air fuel ratio or richer in fuel, and an exhaust sensor arranged upstream or downstream of said $NO_x$, catalyst, said exhaust gas purification control apparatus comprising:

sulphur component calculating means for calculating or estimating a quantity of sulphur components in the exhaust gas; and operation mode changing means for changing an air fuel ratio of the engine on the basis of the detected value of the sulphur contents, wherein said sulphur component calculating means calculates or estimates the concentration of sulphur on the basis of an output signal of said sulphur concentration sensor or said exhaust sensor, wherein said sulphur component calculating means estimates that the slower the response time of said exhaust sensor becomes, the higher the concentration of sulphur is.

2. An exhaust gas purification control apparatus of an engine, said exhaust gas purification control apparatus comprising:

sulphur component calculating means for calculating or estimating a quantity of sulphur components in the exhaust gas; and operation mode changing means for changing an air fuel ratio of the engine on the basis of the detected value of the sulphur contents, wherein said sulphur component calculating means calculates or estimates the concentration of sulphur on the basis of an output signal of said sulphur concentration sensor or said exhaust sensor, wherein a sulphur concentration sensor for detecting the concentration of sulphur is arranged in an exhaust duct of the engine, wherein said sulphur component calculating means calculates or estimates the concentration of sulphur on the basis of an output signal of said sulphur concentration sensor or said exhaust sensor, wherein said sulphur component calculating means estimates that the slower the response time of said exhaust sensor becomes, the higher the concentration of sulphur is.

3. An exhaust gas purification control method, comprising the steps of (a) absorbing or adsorbing NOx when an air fuel ratio of exhaust gas from the engine is lean, (b) reducing the absorbed or adsorbed NOx when the exhaust gas is at the stoichiometric air fuel ratio or richer in fuel, (c) sensing the exhaust gas, (d) calculating or estimating a quantity of sulphur components in the sensed exhaust gas, and (e) changing an air fuel ratio of the engine on the basis of the calculated or estimated quantity of the sulphur components, wherein step (d) comprises estimating that a slower response time of an exhaust gas sensor equates to a higher sulfur concentration.

4. An exhaust gas purification control method, comprising the steps of (a) absorbing or adsorbing NOx when an air fuel ratio of exhaust gas from the engine is lean, (b) reducing the absorbed or adsorbed NOx when the exhaust gas is at the stoichiometric air fuel ratio or richer in fuel, (c) sensing the exhaust gas, (d) calculating or estimating a quantity of sulphur components in the sensed exhaust gas, and (e) changing an air fuel ratio of the engine on the basis of the calculated or estimated quantity of the sulphur components, wherein step (d) comprises calculating or estimating the concentration of sulphur on the basis of an output signal of one of sulDhur concentration and the exhaust gas, wherein step (d) comprises estimating that a slower response time of an exhaust gas sensor equates to a higher sulfur concentration.

* * * * *